Oct. 17, 1933.    F. C. CRAWFORD ET AL    1,931,105
AXLE AND METHOD OF MAKING THE SAME
Filed April 28, 1930    2 Sheets-Sheet 2
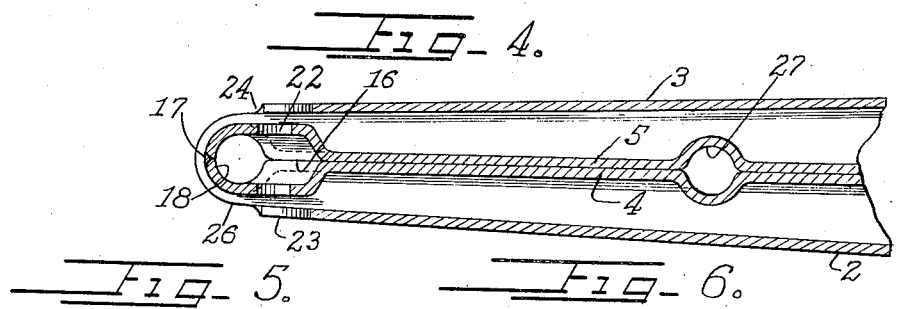
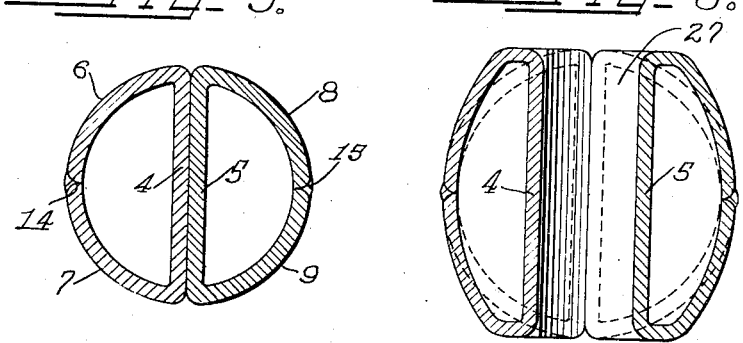
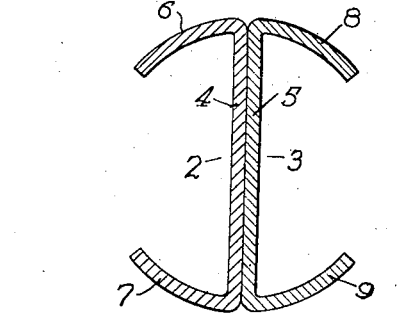
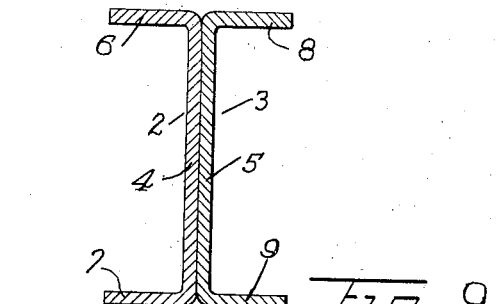
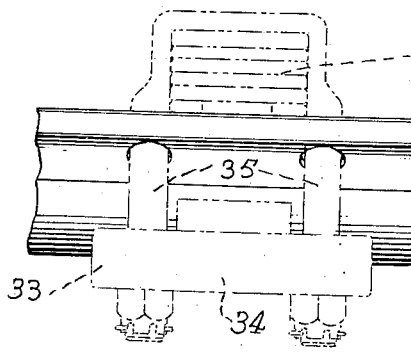
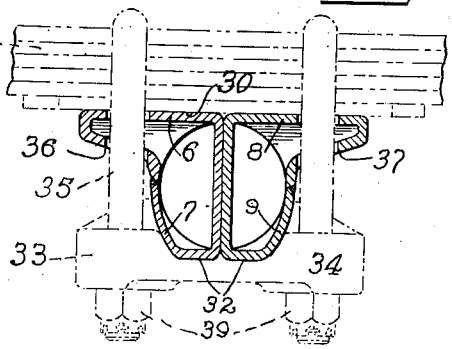
Inventors
Fredrick C. Crawford &
George H. Hufferd.

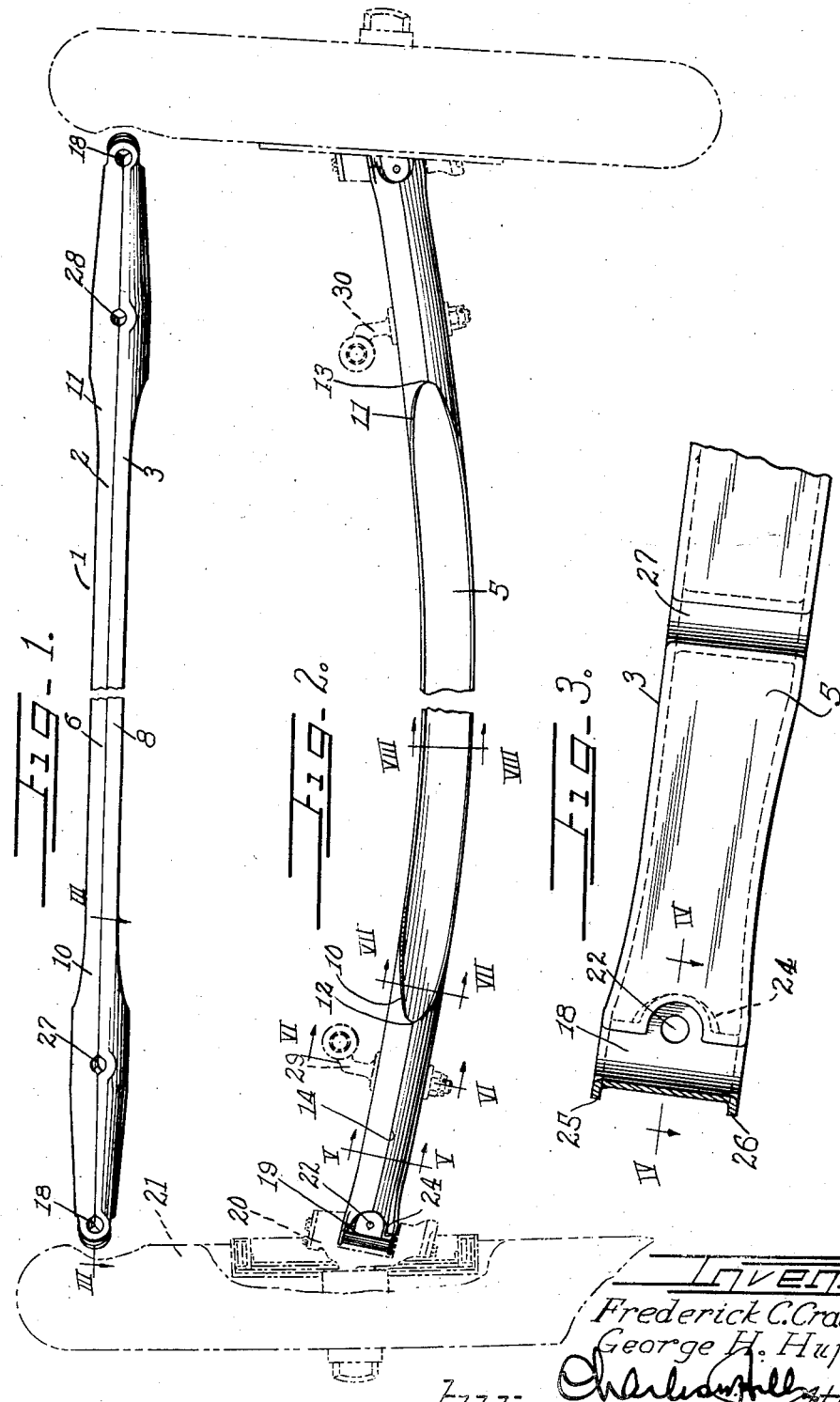

Patented Oct. 17, 1933

1,931,105

UNITED STATES PATENT OFFICE 1,931,105

AXLE AND METHOD OF MAKING THE SAME

Frederick C. Crawford and George H. Hufferd, Detroit, Mich., assignors to Thompson Products, Incorporated, Cleveland, Ohio, a corporation of Ohio Application April 28, 1930. Serial No. 447,871

9 Claims. (Cl. 29—153)

This invention relates to an axle for automotive vehicles.

It is an object of this invention to provide an axle formed of stamped metal members welded or otherwise suitably secured together to form a substantially integral structure of varying cross section, the structural forms of the axle at the end and intermediate portions being best calculated to successfully withstand the stresses and strains peculiar to those portions of the axle.

It is a further important object of this invention to provide an axle for automotive vehicles that can be inexpensively constructed from stamped metal parts suitably formed and welded together to afford maximum strength with minimum weight.

Other and further important objects of this invention will be apparent from the disclosures in the specification and the accompanying drawings.

This invention (in a preferred form) is illustrated in the drawings and hereinafter more fully described.

On the drawings:

Figure 1 is a broken top plan view of an axle embodying the principles of our invention.

Figure 2 is a front elevational view of the axle showing the wheels mounted thereon in dotted lines.

Figure 3 is an enlarged fragmentary sectional view taken substantially on line III—III of Figure 1.

Figure 4 is a sectional view taken substantially on line IV—IV of Figure 3.

Figure 5 is an enlarged sectional view taken substantially on line V—V of Figure 2.

Figure 6 is an enlarged sectional view taken substantially on line VI—VI of Figure 2 with parts removed.

Figure 7 is an enlarged sectional view taken substantially on line VII—VII of Figure 2.

Figure 8 is an enlarged sectional view taken substantially on line VIII—VIII of Figure 2.

Figure 9 is a cross sectional view of a modified form of construction illustrating the manner in which the axle may be secured to the springs of the vehicle.

Figure 10 is a side elevational view of the same.

As shown on the drawings:

The reference numeral 1 indicates as a whole an axle of our invention especially adapted for use as the front axle of an automotive vehicle having the conventional rear drive. Said axle 1 is formed from a pair of metal members 2 and 3 originally of channel cross section, arranged with their vertical web portions 4 and 5 secured together in abutting relation. Said web portions 4 and 5 may suitably be spot welded at different points throughout their length.

Flanges 6 and 7 integral with the web 4 and extending, initially, at right angles thereto, are matched by similar flanges 8 and 9 formed integrally with the web portion 5 of the other member 3. Throughout the intermediate portion of the axle, the flanges 6 and 8 and the flanges 7 and 9 lie in planes normal to the vertical web portions at the top and bottom thereof so as to produce a double channel of I cross section (Figure 8).

Toward the respective ends of the axle 1, the flanges 6, 7, 8 and 9 are uniformly lengthened as at 10 and 11 (Figures 1 and 2) and during the stamping operation said flanges are bent around in the arc of a circle. From the points 12 and 13 (Figure 2) to the respective ends of the axle 1, the length of the respective flanges is such that during the stamping process the lateral edges of the flanges 6 and 7 are brought together as at 14 and the corresponding edges of the flanges 8 and 9 are brought together as at 15 (Figure 5). Said abutting edges are then welded together to form the tubular end portions of the axle.

At the extremities of the axle, the web portions 4 and 5 are spread as at 16 (Figure 4) and the ends of said web portions bent around and welded along their abutting edges as at 17 to form a substantially cylindrical bore 18 at each end of said axle. Said bore 18 is suitably formed at an angle to receive the pivot pin 19 of the steering knuckle 20 of the front wheel 21 of the vehicle. The webs 4 and 5 are preferably bored through their spread-apart portions to provide apertures 22 for receiving a pin for locking the pivot pin 19. Apertures 23 axially aligned with said apertures 22 are likewise formed in the tubular outer portion of the axle formed by the welded flanges 6, 7, 8 and 9. Said tubular portion is cut away adjacent the cylindrical portion of the web, as at 24, and a narrow portion only of each of said flanges 6, 7, 8 and 9 bent around with the web portion forming the cylindrical bore 18 to form flanges 25 and 26 at the top and bottom thereof, respectively.

In order to provide for the mounting of springs upon the axle, the webs 4 and 5 at properly spaced points are spread apart and rounded to provide cylindrical bores 27 and 28 for receiving bolts 29 and 30.

Another manner of mounting the springs upon the axle is shown in Figures 9 and 10. As there shown, the upper flange portions 6 and 8 are spread apart and flattened to provide an enlarged saddle seat 30 on which springs 31 are adapted to rest. The lower flange portions 7 and 8 are but slightly distorted to provide flattened surfaces 32. The spring leaves 31 are held against the upper seat 30 by means of a spring saddle 33 comprising a lower plate 34 and yokes 35 passing through apertures 36 and 37 in the flattened portions of said flanges 6 and 8, respectively, nuts 39 on the lower extended ends of said yokes 35 serving to hold the spring leaves, axle and plates 34 together.

It will thus be appreciated that we have provided axles for automotive vehicles of light yet strong construction. The intermediate portion of the axle being of double channel or I cross section is best adapted to withstand the bending stresses to which the axle is subjected and the tubular structure of the end portions of the axle is that theoretically best able to withstand such tortional stresses as normally result from the operation of the brakes.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. An axle for automotive vehicles, comprising stamped members having abutting web portions secured together and flange portions extending from said web portions, the web portions at the ends being bent around to form sockets.

2. An axle for automotive vehicles, comprising a pair of webbed members initially of channel cross section secured along the surfaces of their respective webs, the flanges of each of said members being bent around and joined forming tubular portions toward the ends of said members, the webs being bent around at the ends forming sockets.

3. An axle for automotive vehicles comprising a pair of stamped metal members having vertical webs spot welded together and flanges extending laterally therefrom, said flanges being of increasing width toward the ends and being bent around and joined together providing tubular end portions.

4. An axle comprising matched stamped metal members having vertical coextensive web portions united together and having flanges extending laterally from the top and bottom of said web portions integral therewith, said flanges and webs throughout an intermediate portion of said axle being of I cross section and toward the ends of said axle being of substantially semicircular cross section, the flanges for the length of said end sections being rounded and welded along their abutting edges, the web portions at spaced points and at the ends of said members being bent to form cylindrical bores.

5. The method of forming an axle for automotive vehicles, which comprises forming a pair of matched channel members with flanges of corresponding width throughout corresponding intermediate portions thereof and with wider flanges throughout corresponding end portions thereof securing said members together with their respective webs in abutting relation, subjecting said joined members to a stamping operation to bend said wider flanges to cause corresponding edges thereof to abut each other and welding said abutting edges together to form tubular end portions.

6. The method of forming an axle for automotive vehicles, which comprises forming a pair of matched channel members with flanges of corresponding width throughout corresponding intermediate portions thereof and with wider flanges throughout corresponding end portions thereof securing said members together with their respective webs in abutting relation, subjecting said joined members to a stamping operation to bend said wider flanges to cause corresponding edges thereof to abut each other, welding said abutting edges together to form tubular end portions, spreading and bending the web portions at the extremities of said tubular portions to substantially cylindrical form and welding the abutting edges of the ends of said bent web portions to form bores at the ends of said axle.

7. An axle for automotive vehicles comprising a pair of stamped metal members having vertical webs secured together and having their end sections rounded and welded together to form cylindrical bores.

8. An axle for automotive vehicles comprising a pair of stamped metal members having vertical webs secured together having their end sections rounded and welded together to form cylindrical bores and the end sections of the webs rounded and welded together to form cylindrical bores.

9. An axle for automotive vehicles formed of stamped members having abutting web portions secured together and flange portions extending from said web portions, said flange portions being gradually lessened toward their ends and bent into abutting relationship and said web portions being bent around at their ends to form sockets.

FREDERICK C. CRAWFORD.
GEORGE H. HUFFERD.